(12) United States Patent
Hintze

(10) Patent No.: US 10,022,855 B2
(45) Date of Patent: Jul. 17, 2018

(54) TOOL RETAINING APPARATUS

(71) Applicant: Ian Hintze, Lynbrook, NY (US)

(72) Inventor: Ian Hintze, Lynbrook, NY (US)

( * ) Notice: Subject to any disclaimer, the term of this patent is extended or adjusted under 35 U.S.C. 154(b) by 0 days.

(21) Appl. No.: 15/395,815

(22) Filed: Dec. 30, 2016

(65) Prior Publication Data
US 2017/0190043 A1    Jul. 6, 2017

Related U.S. Application Data

(60) Provisional application No. 62/273,830, filed on Dec. 31, 2015.

(51) Int. Cl.
*A45F 5/02* (2006.01)
*B25H 3/00* (2006.01)
*F16B 45/02* (2006.01)

(52) U.S. Cl.
CPC .............. *B25H 3/00* (2013.01); *A45F 5/021* (2013.01); *F16B 45/02* (2013.01)

(58) Field of Classification Search
CPC .... A45F 5/02; A45F 5/021; A45F 2200/0575; Y10T 24/1391; Y10T 24/1394; Y10T 24/1388; B25H 3/00; B25H 3/006
USPC ....... 248/690, 691, 692, 301, 303, 304, 305, 248/306; 224/575, 195, 666, 673, 678, 224/236, 904
See application file for complete search history.

(56) References Cited

U.S. PATENT DOCUMENTS

| | | | |
|---|---|---|---|
| 1,148,369 A | 7/1915 | Farmer | |
| 1,553,066 A | 9/1925 | Burger | |
| 2,469,386 A * | 5/1949 | Hanson | A45F 5/02 224/242 |
| 2,783,536 A | 3/1957 | McQueary | |
| 3,168,971 A | 2/1965 | Goertzen | |
| 3,384,277 A | 5/1968 | Hodelka | |
| 3,450,317 A * | 6/1969 | Ramer | A45F 5/02 224/242 |
| D221,123 S | 7/1971 | Nicholas | |
| 3,599,847 A * | 8/1971 | Danielson | A45F 5/02 224/673 |
| 4,106,679 A | 8/1978 | Hillinger | |
| 4,277,892 A | 7/1981 | Rushforth | |
| 4,638,530 A * | 1/1987 | Perry | A45F 5/02 224/904 |
| 4,645,104 A | 2/1987 | Vokaty | |
| 4,790,461 A | 12/1988 | Stover | |
| D312,385 S | 11/1990 | Hamann | |
| 5,195,667 A * | 3/1993 | Gallant | A45F 5/02 224/197 |
| 5,211,322 A | 5/1993 | Nealy | |

(Continued)

*Primary Examiner* — Terrell L McKinnon
*Assistant Examiner* — Michael McDuffie
(74) *Attorney, Agent, or Firm* — Hoffmann & Baron, LLP

(57) ABSTRACT

A tool retaining apparatus including a base and a tool support secured to the base. The tool support has a pair of spaced arms for supporting a tool there between. A securement member is disposed on the base between the two arms. The support member has a distal end. The distal end and the pair of spaced arms forming a tool holding space there between adapted to receive at least a portion of a tool. The distal end is movable between a first position wherein a path to the tool holding space is closed to prevent removal of the tool therefrom and a second position wherein the path is open to permit removal of the tool from the tool holding space.

16 Claims, 11 Drawing Sheets

(56) References Cited

U.S. PATENT DOCUMENTS

| | | | |
|---|---|---|---|
| 5,248,072 A * | 9/1993 | Jones | A45F 5/14 224/247 |
| D360,294 S | 7/1995 | Johnson | |
| 5,605,263 A | 2/1997 | Pursley et al. | |
| 5,810,225 A * | 9/1998 | Andrew | A45F 5/021 224/271 |
| 5,927,580 A * | 7/1999 | Ward-Llewellyn | A45F 5/02 224/194 |
| 5,944,242 A * | 8/1999 | Musarella | A45F 5/02 224/270 |
| 5,946,733 A | 9/1999 | Spooner | |
| 5,957,421 A * | 9/1999 | Barbour | A45F 5/02 224/197 |
| 5,992,716 A | 11/1999 | Riley | |
| 6,062,449 A * | 5/2000 | Kahn | A45F 5/02 224/268 |
| 6,102,264 A * | 8/2000 | Redzisz | A45F 5/02 224/197 |
| 6,145,717 A | 11/2000 | Rebeck | |
| 6,193,125 B1 * | 2/2001 | Grover | A45F 5/02 224/195 |
| D452,610 S | 1/2002 | Schwartzmiller | |
| 6,443,342 B1 | 9/2002 | Kahn | |
| 6,729,517 B2 * | 5/2004 | Grover | A45F 5/02 224/195 |
| 7,077,303 B2 | 7/2006 | Zega | |
| 7,195,140 B1 | 3/2007 | Marinelli | |
| D558,034 S | 12/2007 | Ernst | |
| 7,520,844 B1 | 4/2009 | Flynn | |
| 7,802,706 B1 | 9/2010 | Selsor | |
| 8,387,840 B1 | 3/2013 | Selsor | |
| 2002/0117521 A1 | 8/2002 | Brandt | |
| 2004/0065709 A1 * | 4/2004 | Dillenberger | A45F 5/02 224/682 |
| 2007/0045372 A1 * | 3/2007 | Cangemi, Jr. | A45F 5/02 224/673 |
| 2007/0138227 A1 * | 6/2007 | Rickman | A45F 5/02 224/669 |
| 2007/0170220 A1 * | 7/2007 | Fragassi, III | A45F 5/02 224/660 |
| 2008/0209698 A1 * | 9/2008 | Colorado | A45F 5/02 24/595.1 |
| 2010/0219312 A1 * | 9/2010 | Johnson | A45F 5/02 248/231.81 |
| 2015/0122856 A1 * | 5/2015 | Pecotte | A45F 5/00 224/268 |
| 2015/0351523 A1 * | 12/2015 | West | A45F 5/02 224/269 |

* cited by examiner

TOOL RETAINING APPARATUS

This application claims the benefit of priority to U.S. Provisional Patent Application Ser. No. 62/273,830 filed on Dec. 31, 2015 the content of which is incorporated by reference herein in its entirety.

FIELD OF THE INVENTION

The present disclosure relates to a tool retaining apparatus. More particularly, the present disclosure relates an apparatus for securely retaining a tool to a user to prevent unintentional removal of the tool or separation of the tool from the user.

BACKGROUND

Workers who need ready access to tools in order to complete a project often desire to have the tool attached to their person. This is typically achieved through the use of tool pouches, clips, or loops. When working at heights, it is very important that any tool attached to the user be secured such that it does not inadvertently become unattached and thus fall. In these working environments, unintentional separation of a tool, such as a hammer, from a user can result in serious personal injury and property damage.

Various tool holders have been contemplated in order to secure a tool to a user such that it prevents the tool from inadvertently separating from the user. Various construction sites mandate workers to include drop prevention devices for securing their tools. However, such tool securing devices can make it difficult for the tool to be removed and reattached to the securing device. This reduces a worker's productivity. In addition, difficulty in using the tool holder increases the likelihood that a worker will not properly use the holder to secure the tool. Thus the tool may not be properly secured.

Accordingly, it would be desirable to have a device which securely retains a tool to a user but also allows the tool to be easily removed and replaced securely in the device.

SUMMARY

The present disclosure provides a tool retaining apparatus including a base and a tool support secured to the base. The tool support has a pair of spaced arms for supporting a tool there between. A securement member is disposed on the base between the two arms. The support member has a distal end. The distal end and the pair of spaced arms forming a tool holding space there between adapted to receive at least a portion of a tool. The distal end is movable between a first position wherein a path to the tool holding space is closed to prevent removal of the tool therefrom and a second position wherein the path is open to permit removal of the tool from the tool holding space.

The present disclosure also provides a tool retaining apparatus including a base and a tool support secured to the base. The tool support has a pair of spaced arms for supporting a tool there between. The arms have a support surface for supporting a tool thereon. A securement member is disposed on the base between the two arms and spaced from the support surface. The securement device and support arms form a space there between adapted to receive a head of a tool. The securement member has a first position extending over and above the support surface and adapted to prevent removal of a tool from the tool support, and a second position disposed toward the base and creating a path between the support surface and ends of the arms adapted to permit removal of the tool from the tool support.

The present disclosure further provides a tool retaining apparatus including a base and a tool support secured to the base. The tool support has a pair of spaced arms for supporting a tool there between. The arms have a support surface for supporting a tool thereon. A securement member is disposed on the base between the two arms and spaced from the support surface. The securement device and support arms form a space there between adapted to receive a head of a tool. The securement member has a first position extending over and above the support surface and adapted to prevent removal of a tool from the tool support, and a second position disposed toward the base and creating a path between the support surface and ends of the arms adapted to permit removal of the tool from the tool support.

DETAILED DESCRIPTION

Figure 1:
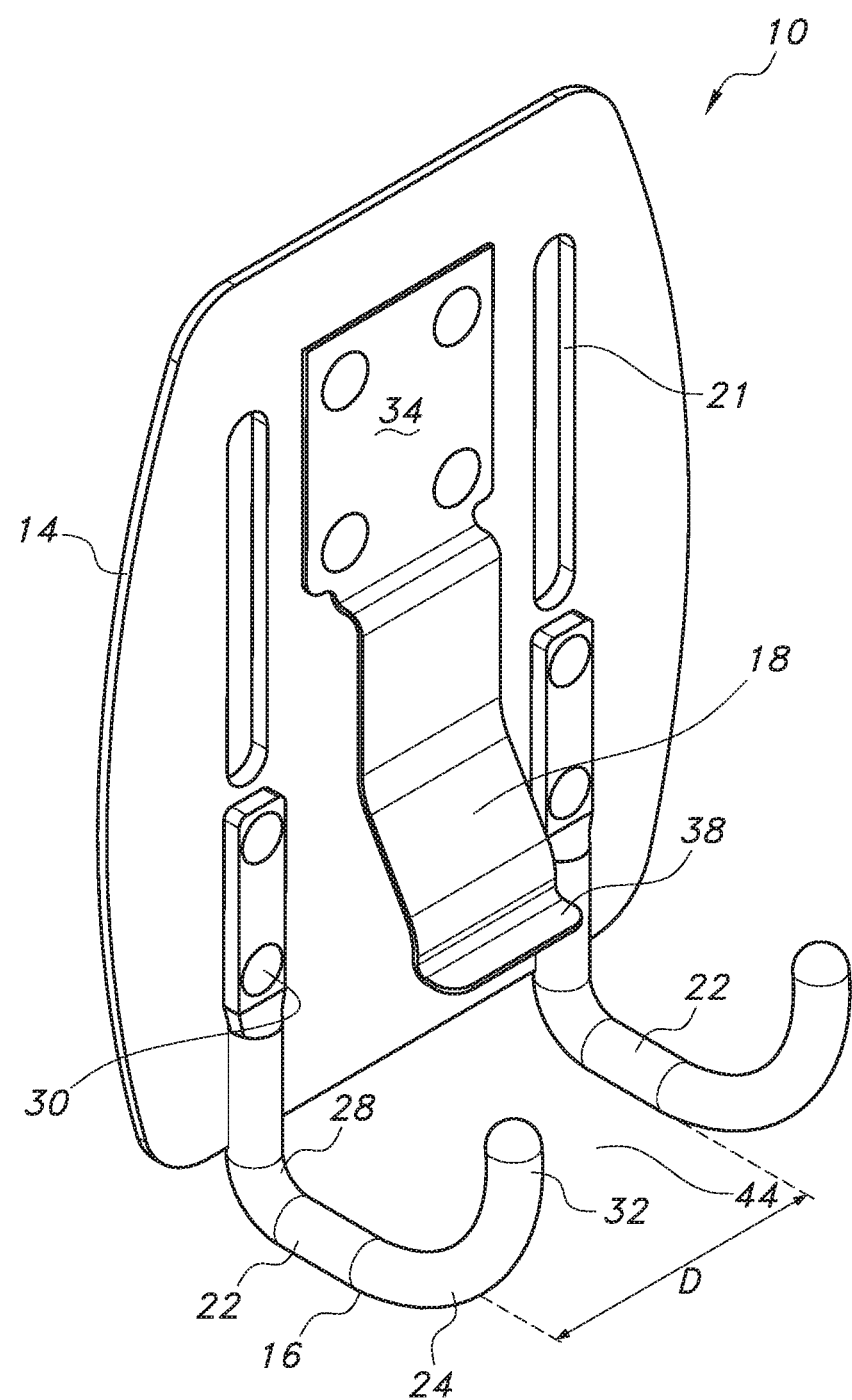
FIG. 1 is perspective view of a tool retaining apparatus
Figure 2:
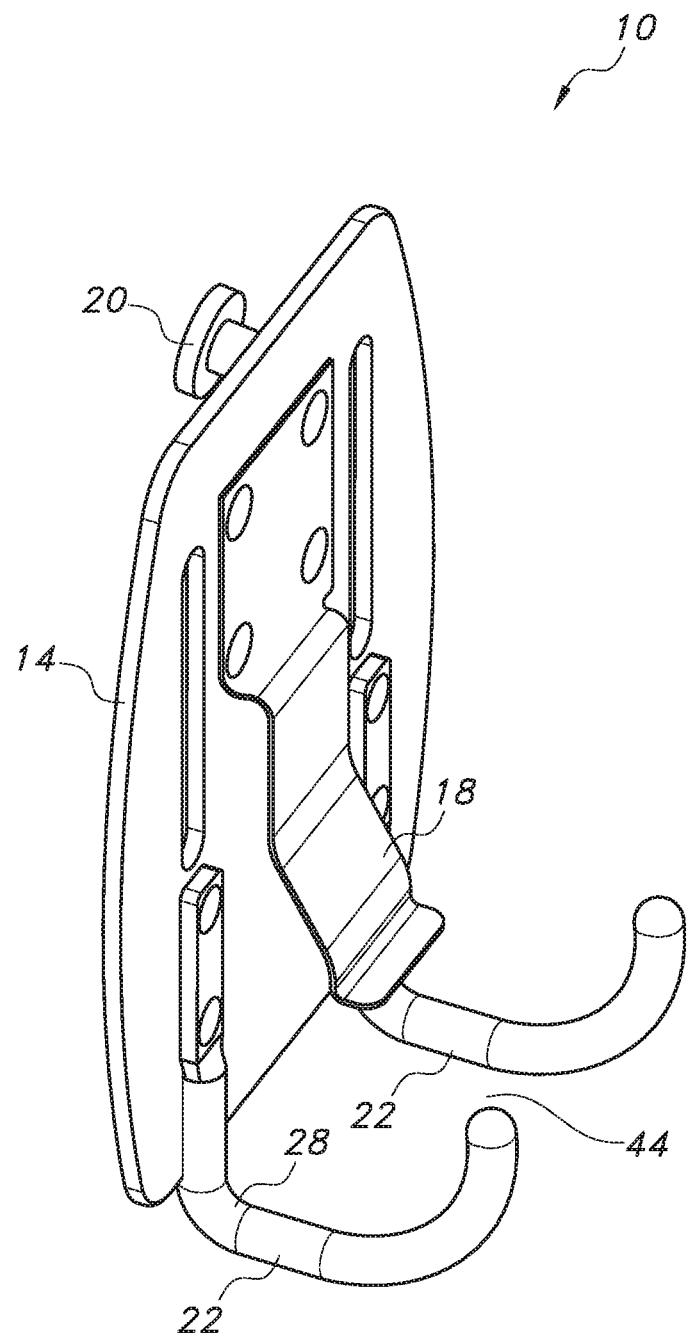
FIG. 2 is perspective view of the tool retaining apparatus.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

With reference to FIGS. 1-4, a tool retaining apparatus 10 for securing a tool 12 to a user is shown. The tool retaining apparatus permits a tool to be securely retained while allowing it to be repeatedly unsecured and removed and then secured to the apparatus 10 by a user. The tool 12 to be secured may be in the form of a hammer. Other tools may be secured such as tools that have a handle and a shoulder, for example, a spud wrench, wrench, pick, mallet, etc. This listing is intended to be illustrative and not limiting.

The tool retaining apparatus 10 includes a planar base 14 to which a tool support 16 is secured. The base 14 may be formed of a rigid material such as steel or aluminum or a pliable material such as leather. A tool securement member 18 is connected to the base 14 and selectively secures the tool 12 in the tool support 16. The securement member 18 prevents the tool from inadvertently separating from the tool support 16. The base 14 may further include an attachment device for securing the tool retaining apparatus 10 to a user.

The base 14 of the tool retaining apparatus may be a generally flat planar member. In one embodiment it may be formed of a pliable material such as leather. Alternatively, the base 14 may be a rigid member formed of metal or other rigid material. The attachment device may include one or more slots 21 in the planar member sized to receive a belt so it may be secured to a user. Alternatively, the attachment device may be in the form of a lug 20 secured to the back surface of the base 14 for allowing the tool retaining member to be releasable attached to a holder (not shown). The holder may be secured to the user and include a slot for releasably receiving the lug 20. In this arrangement, the tool retaining apparatus 10 may pivot freely thereby allowing a user to rotate the tool retaining apparatus to facilitate removal and insertion of the tool therein. The ability to pivot also allows the user to move the tool to a desired location while working and not using the tool such that the tool does not hamper the movement.

Figure 3:
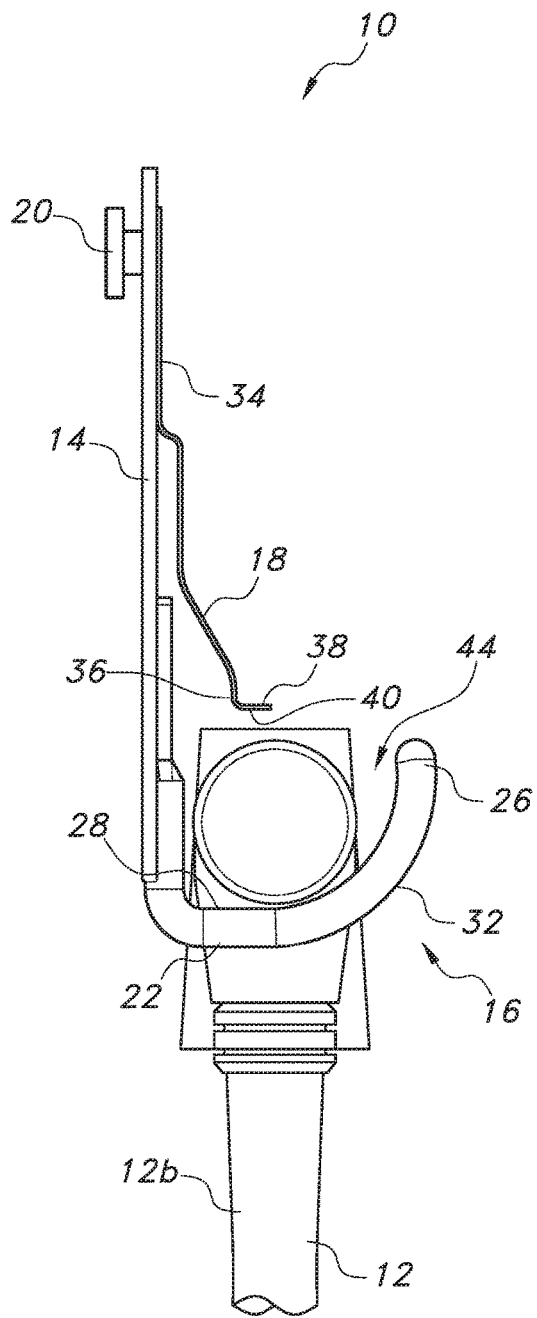
FIG. 3 is a side elevational view showing the tool retaining apparatus holding a tool with a securement member in a locked position.
Figure 4:
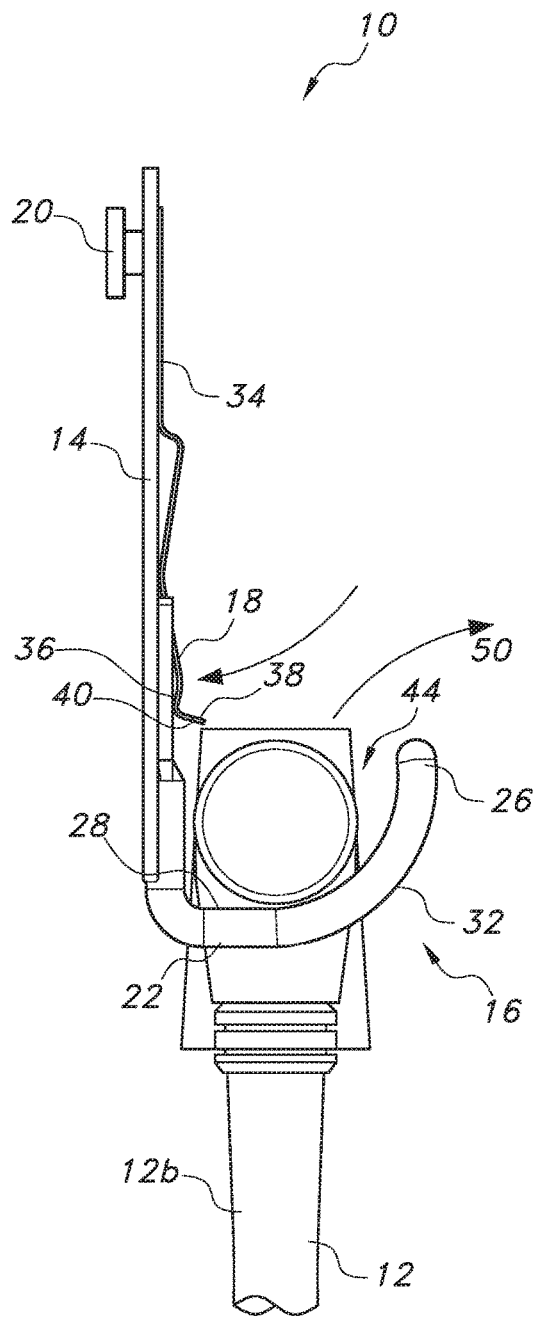
FIG. 4 is a side elevational view showing the tool retaining apparatus holding a tool with a securement member in an unlocked position.
Figure 5:
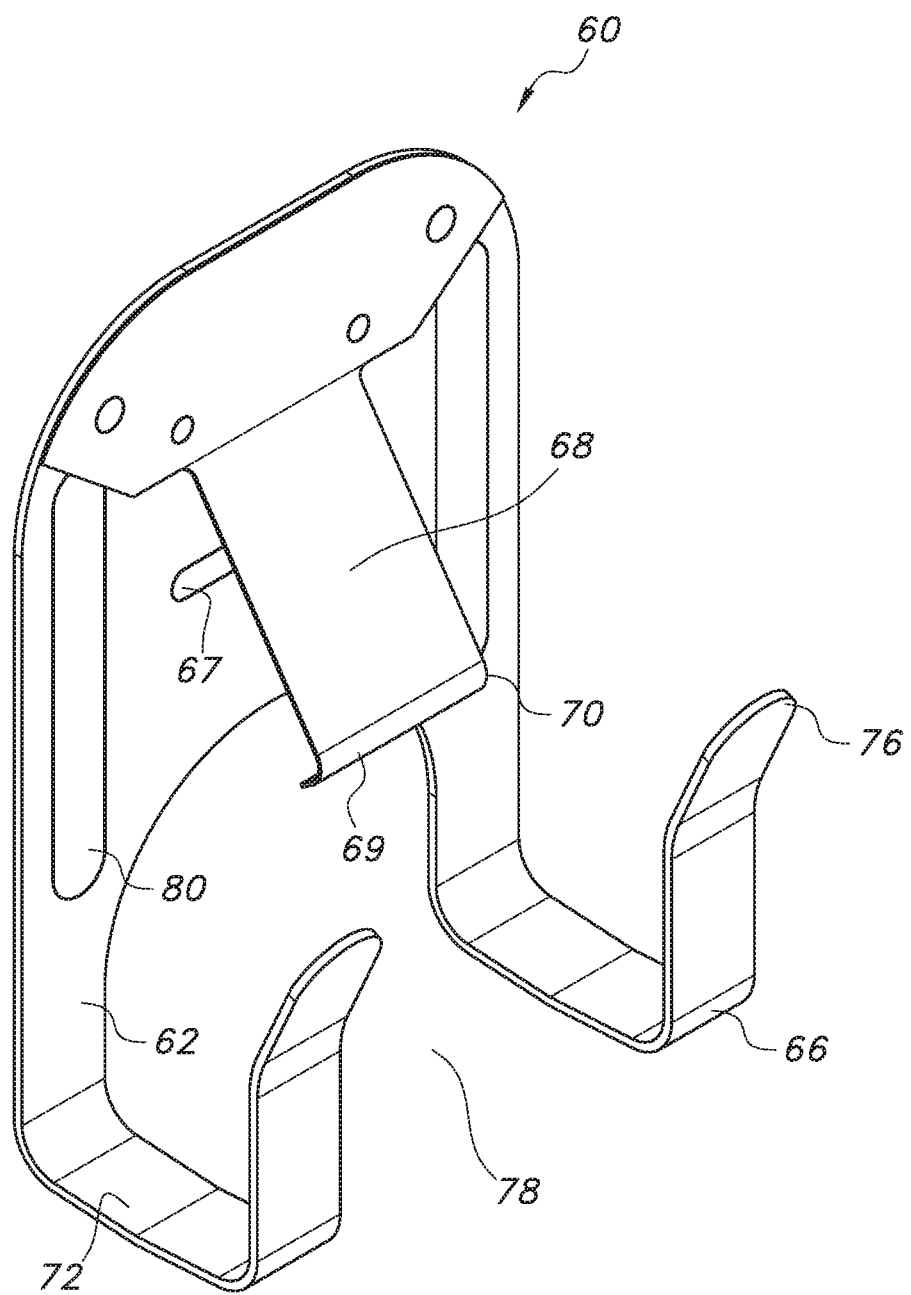
FIGS. 5 and 6 are perspective views of an alternative embodiment of a tool retaining apparatus.
Figure 6:
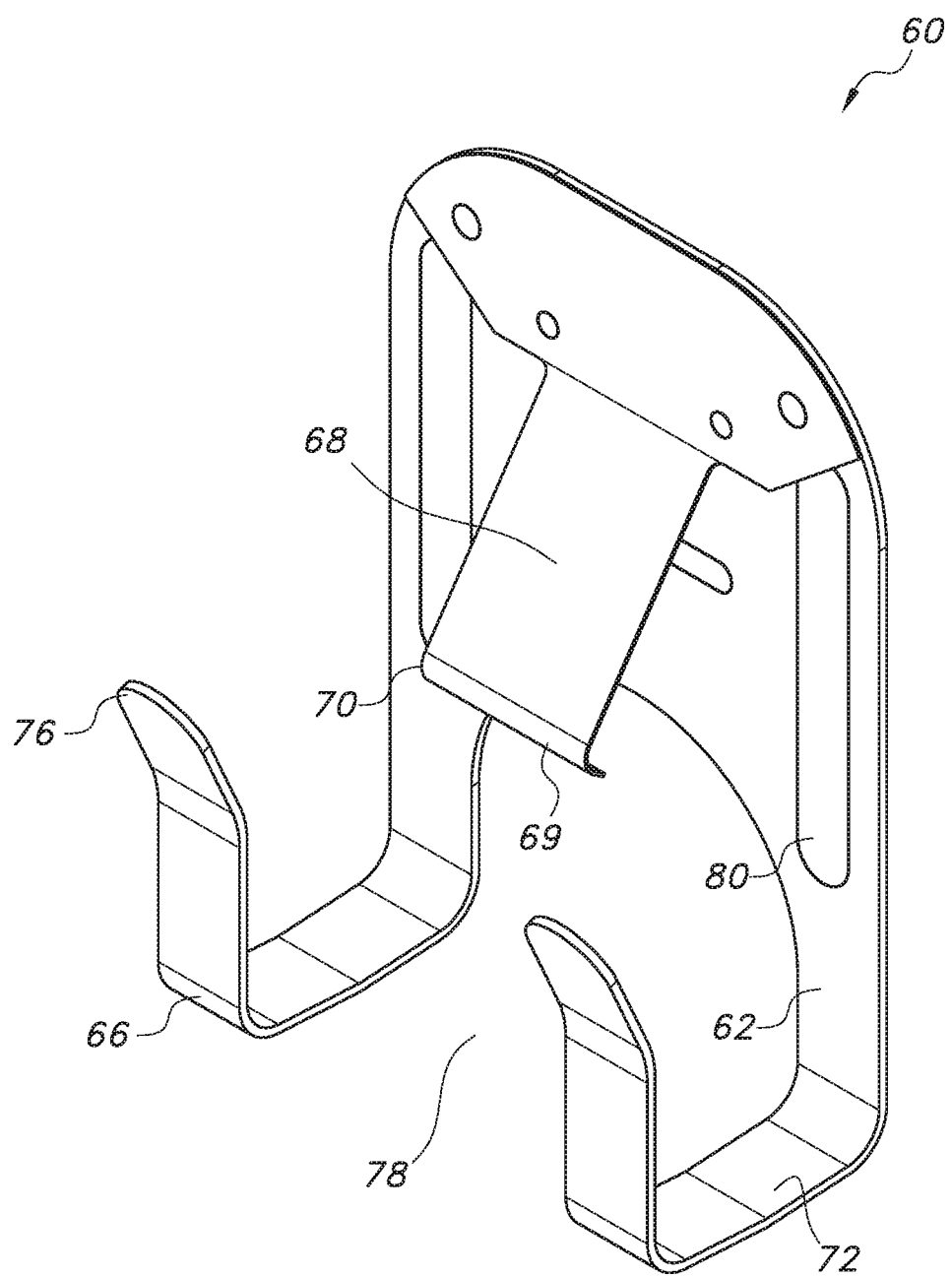

The tool support 16 may be in the form of a pair of curved arms 22 having a hook-like configuration. Each arm 22 may have a first generally straight portion 24 which ends in an upwardly curved end member 26. The straight portions 24 may form a support surface 28 upon which the tool 12 rests as shown in FIGS. 3 and 4. The arms 22 may be fastened to the base 14 via rivets, screws or other fastening devices 30 known in the art. The arms 22 may be formed of a rigid member such as steel or other structurally supportive material. The arms 22 may be spaced a distance D from each other such that they support the head 12a of a tool and allow the handle to extend therebetween. For example, when a tool such as a hammer is being supported, one arm 22 may support the claw and the other arm 22 may support the neck of the hammer disposed adjacent to the hammers face. When the hammer is placed within the tool support, the handle of the hammer 12b and/or lower part of the head extends downwardly between the arms 22 with the head being supported by the arms 22. The arms 22 may be coated in a resilient material 32 in order to help seat the hammer head 12a onto the tool support 16.

The tool retaining apparatus 10 includes a securement member 18 attached to the base 14. The securement member 18 prevents the tool 12 from inadvertently separating from the tool support 16 such as when a user is moving, or changing opposition, and also allows the tool to be easily removed and placed securely back into the tool support. The securement member 18 may include a cantilevered, resilient member having a first end 34 fixedly secured to the base 14 above the arms 22. The securement member 18 may be disposed between the two spaced arms 22. The securement member 18 may be formed of steel, spring steel, plastic, or other resilient material.

The securement member 18 extends outwardly from the first end 34 toward a second unsupported distal second end 36. The distal end 36 forms a catch 38. The catch 38 may include a curved engagement portion 40 that extends generally outwardly from the securement member 18. The securement member 18 may be urged by a user toward the base 14 against the resilient action of the material. When released, the securement member 18 moves away from the base 14 and returns to its initial position. Thus, the securement member 18 is biased toward its initial position. Accordingly, the catch 38 has a first extended locking position disposed away from the base 14. In the first position, the securement member 18 may be in an unbiased state. The catch 38 may be urged toward the base 14 to a second retracted unlocked position which is disposed closer to the base 14 than when in the first extended position. In the retracted position, the securement member 18 is in a biased or flexed position.

When a tool 12, such as a hammer, is inserted into the tool support 16, the hammer engages the catch 38 and moves the securement member 18 from the first position, shown in FIG. 3, toward the retracted second position, shown in FIG. 4. When the hammer head is seated on the arms 22, the top of the hammer head sits below the catch 38. Accordingly, the resilient securement member 18 flexes back toward the first position. The catch 38 and support surface 28 form a space 44 there between for securely retaining the hammer. In the first position, shown in FIG. 3, the catch 38 is disposed over the hammer head 12a. If the tool 12 is moved upwardly, it will engage the catch; therefore, the tool's movement is restricted. In this position, the securement member 18 with its catch 38 prevents the tool 12 from being moved upwardly to a point where the tool would clear the upwardly extending end members 26 of the support arms 22. Accordingly, the securement member 18 prevents the tool 12 from being removed from the tool retaining apparatus 10. Even if the user moves in a certain way or if the tool 12 gets bumped, the tool will not separate from the tool retaining apparatus 10.

In order to secure the tool within the tool retaining apparatus 10, the user may place the handle between the arms and lower the hammer head such that it passes the catch and sits on the support arms. The catch then extends outwardly above the tool head, FIG. 3. In this secured position, the tool 12 is securely retained in the tool retaining apparatus 10. For example, if the user were to run or fall or make other motions, the tool 12 would not inadvertently separate from the tool retaining apparatus 10. The act of placing the tool within the tool securement device 10 causes it to be secured therein. No further action of the user is required.

In order to remove the tool 12 from the tool retaining apparatus 10, deliberate action of the user is required. A user may urge the catch 38 toward the second unlocked position as shown in FIG. 4. In this position, with the catch 38 is moved away from the tool 12 and a clear unobstructed path 50 is created between the upwardly ending portion of the arms and the catch. This permits the tool 12 to be lifted up and over the arms 22 and separated from the tool retaining apparatus 10. The position of the catch 38 just above the head of the hammer permits a user to, with one hand, depress the catch and lift the hammer free of the tool retaining apparatus 10. For example, the user need only depress the catch 38 with their thumb while lifting up on the tool 12 with the other fingers. Therefore, only one handed operation is needed in order to release the tool from the tool retaining apparatus.

Accordingly, a user can easily and repeatedly secure and remove the tool 12 from the tool retaining apparatus without any undo complications. No further action of the user is required.

Figure 12:
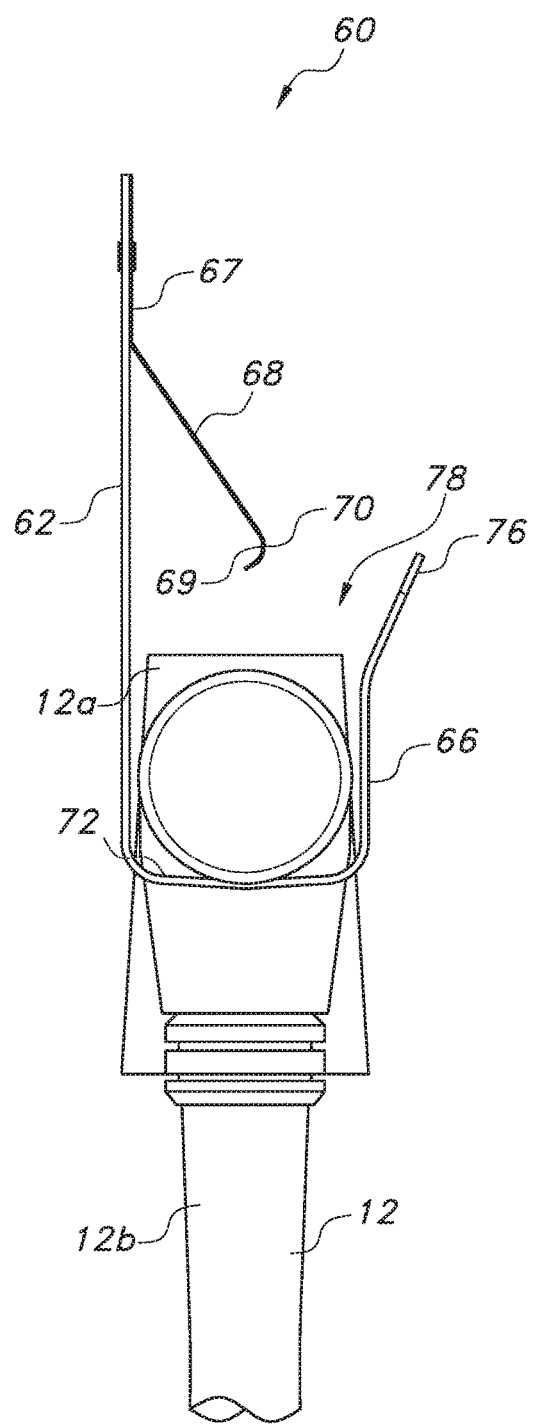
FIG. 12 is a side elevational view showing the tool retaining apparatus holding a tool with a securement member in a locked position.
Figure 13:
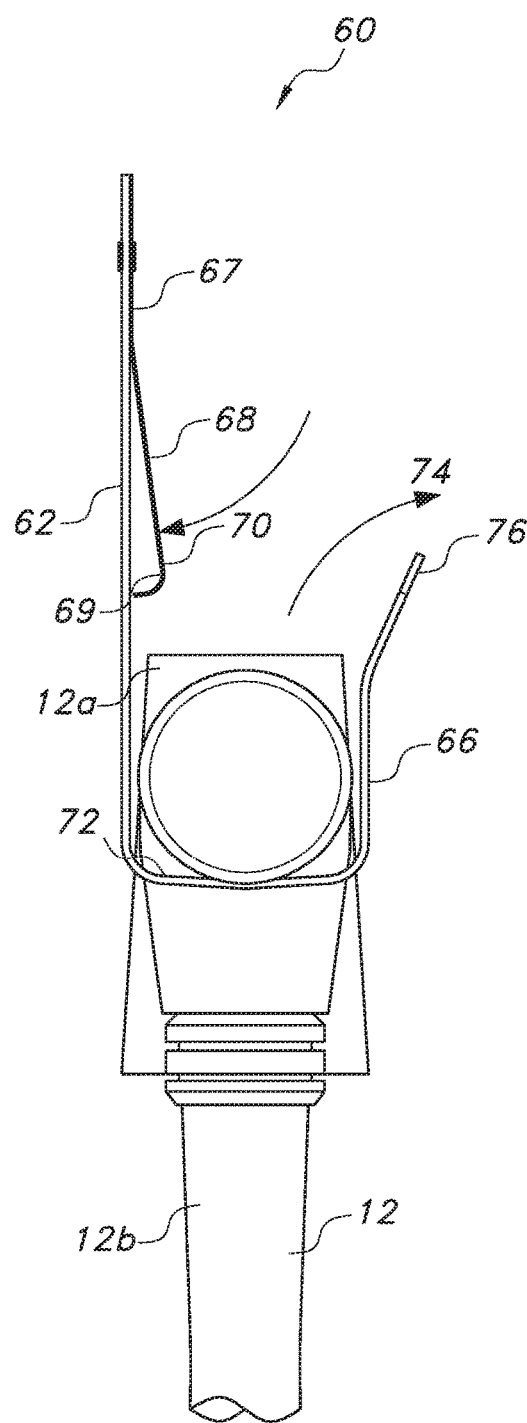
FIG. 13 is a side elevational view showing the tool retaining apparatus holding a tool with a securement member in an unlocked position.

With reference to FIGS. 5-13, an alternative embodiment of the tool retaining apparatus 60 is shown. The apparatus 60 is similar to the apparatus 10 described above except that the base 62 and curved support arms 66 may be formed of a single piece of rigid material. The material may be metallic such as steel or aluminum. The spaced arms 66 each extend downwardly from the base 62 and then outwardly from the base forming a tool support surface 72. The arms 66 then extend upwardly and curl outwardly to an upper end 76. The arms support the tool head 12a on a support surface 72 and the tool handle 12b passes through the space D between the arms 66 as shown in FIGS. 12 and 13.

Figure 7:
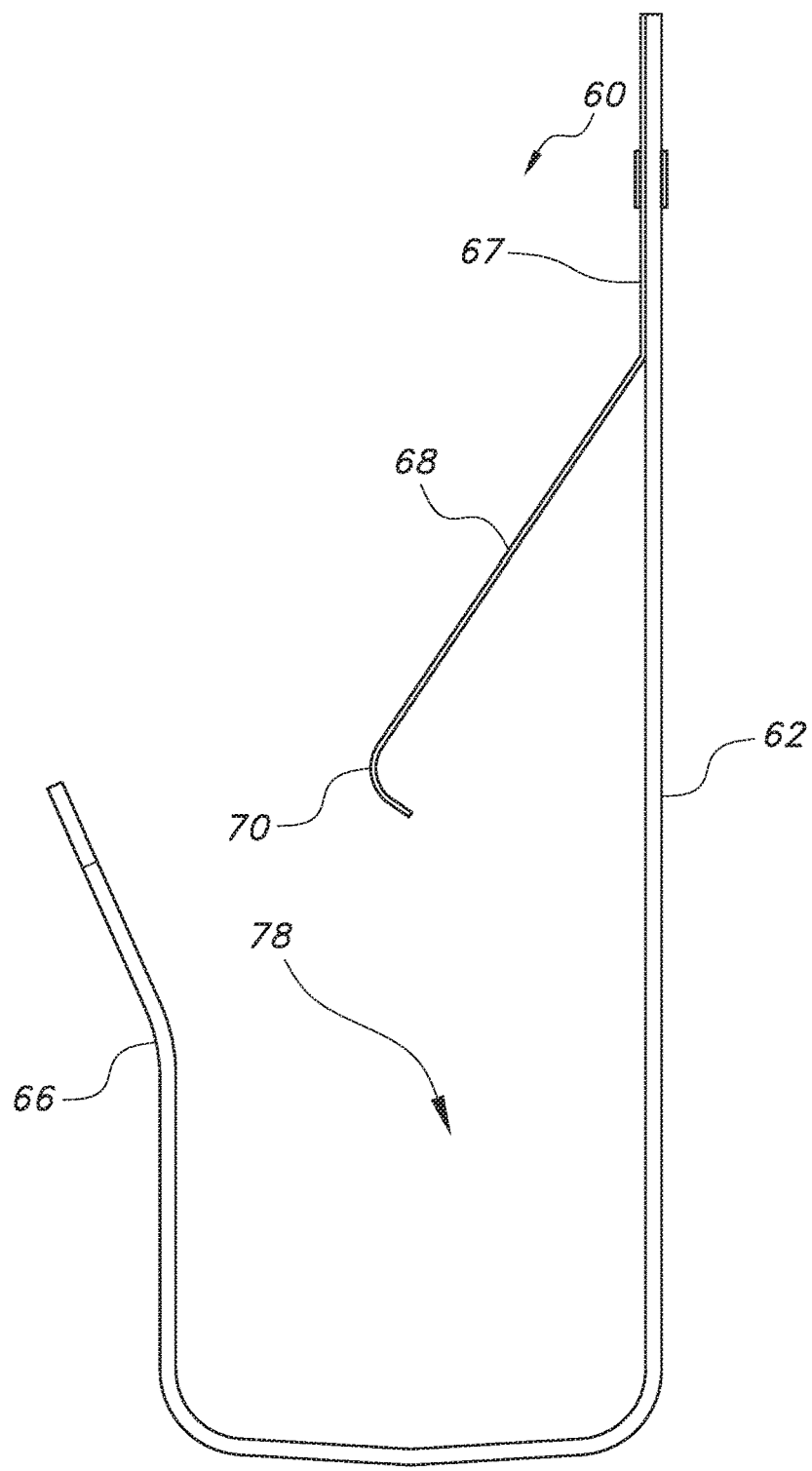
FIG. 7 is a side elevational view of the tool retaining apparatus of FIG. 5.
Figure 8:
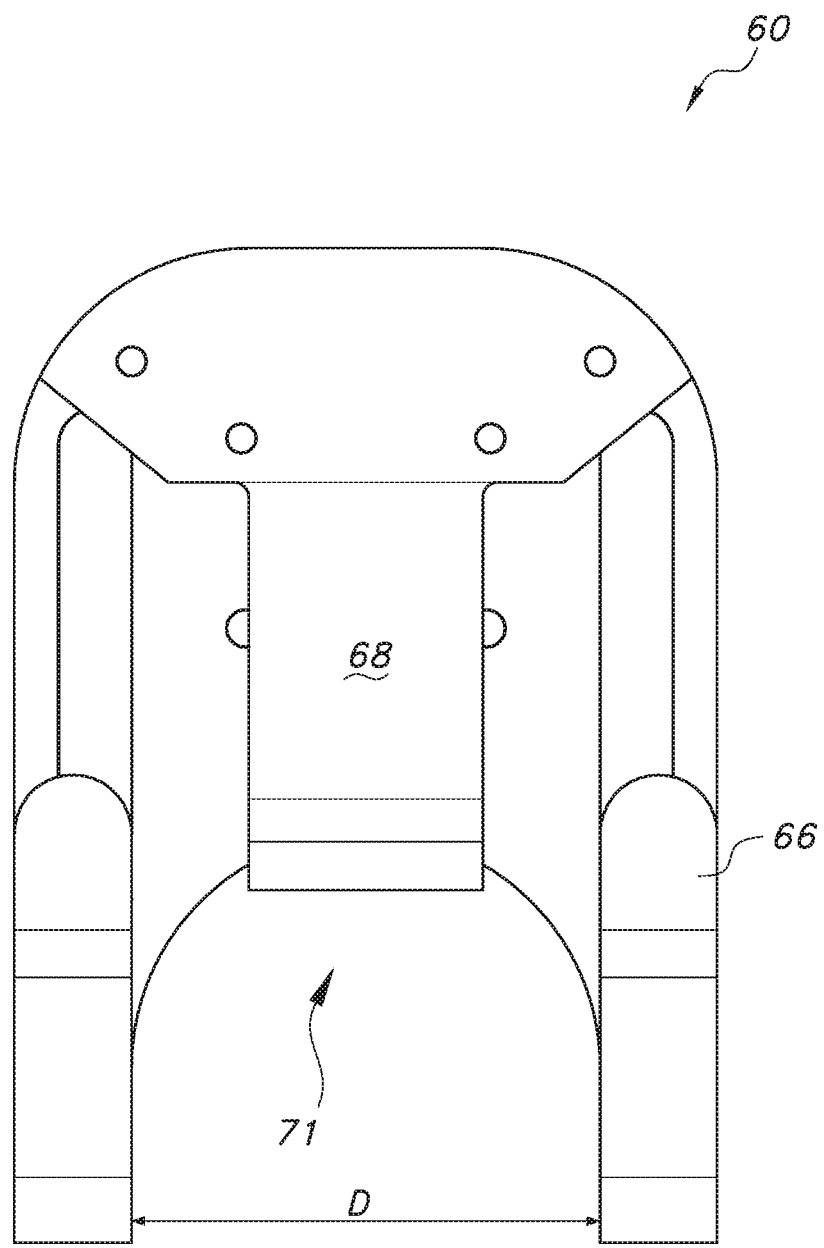
FIG. 8 is a front elevational view of the tool retaining apparatus of FIG. 5
Figure 9:
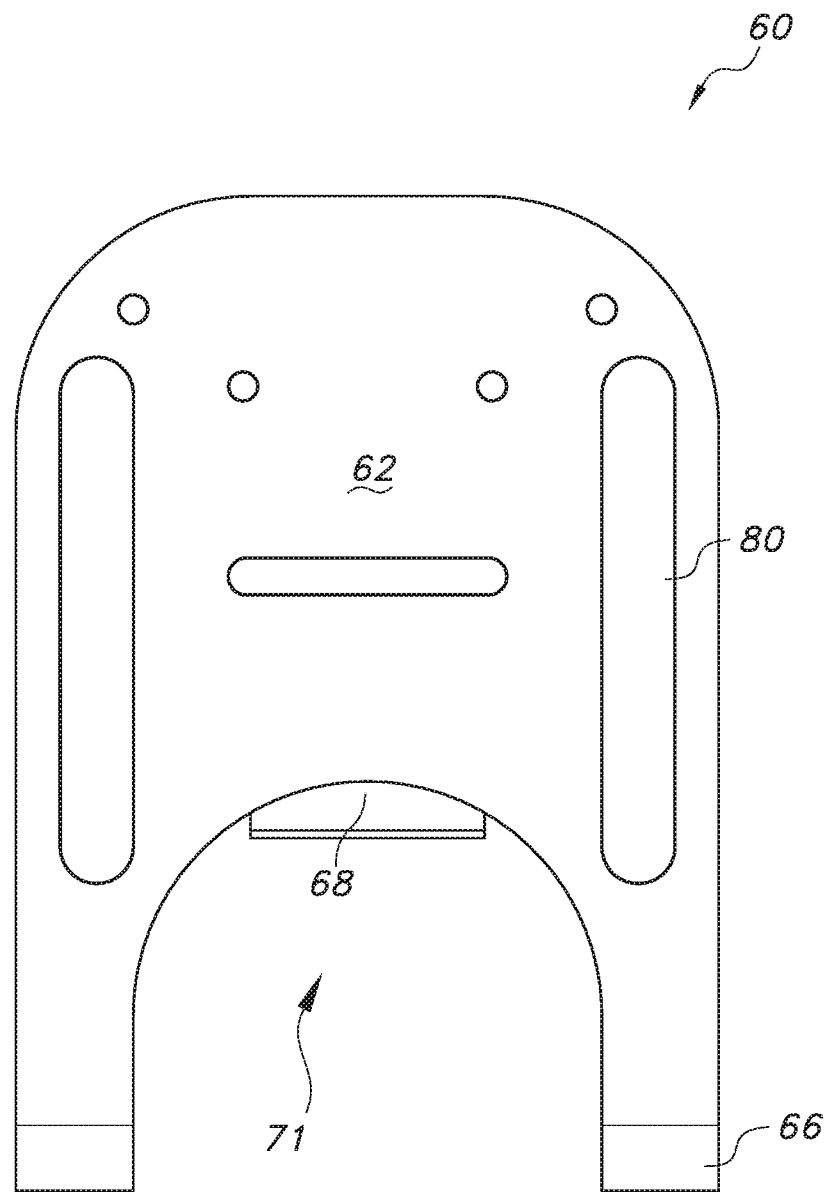
FIG. 9 is a back elevational view of the tool retaining apparatus of FIG. 5
Figure 10:
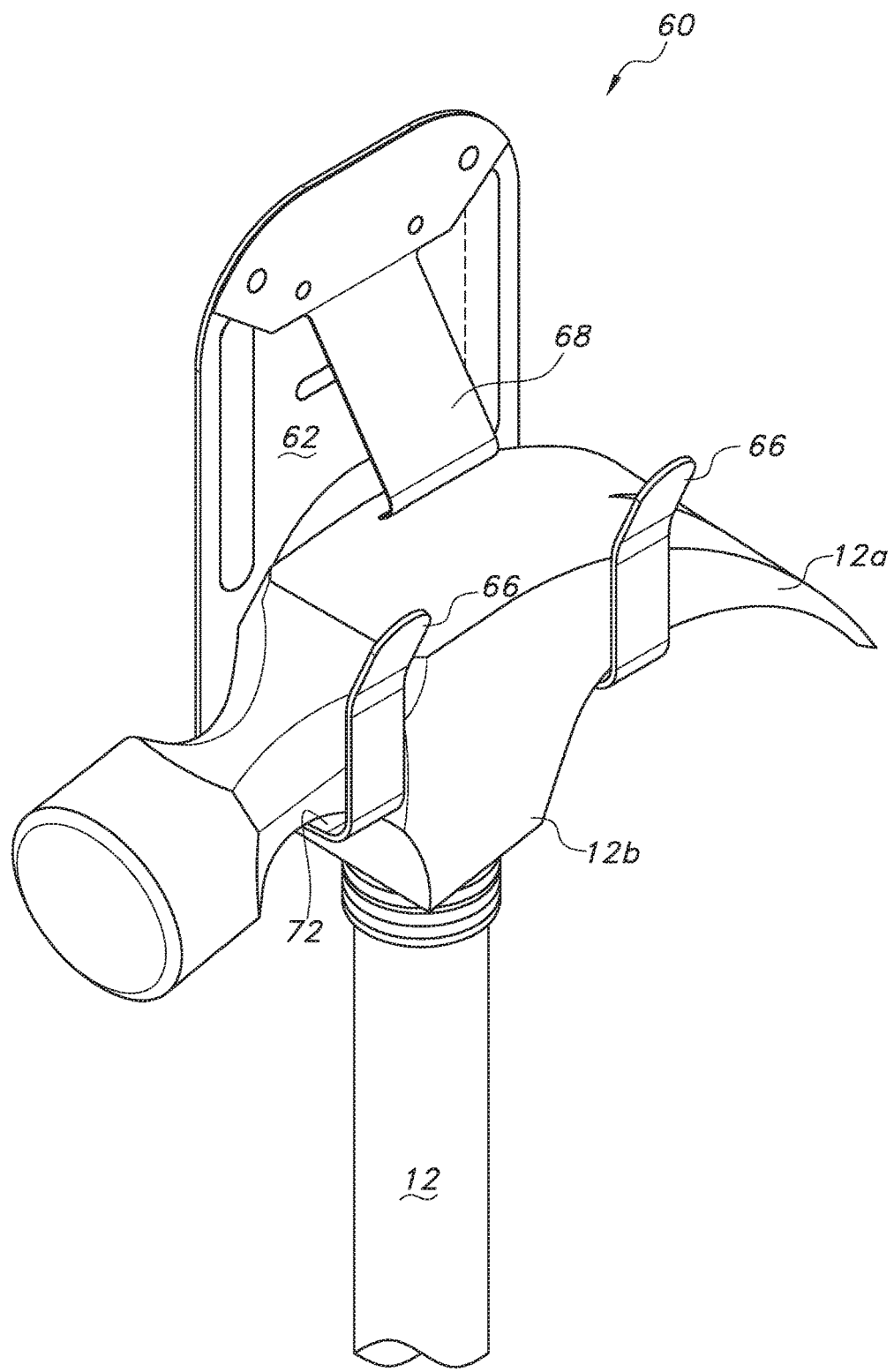
FIG. 10 is a top perspective view showing the tool retaining apparatus of FIG. 5 holding a tool.
Figure 11:
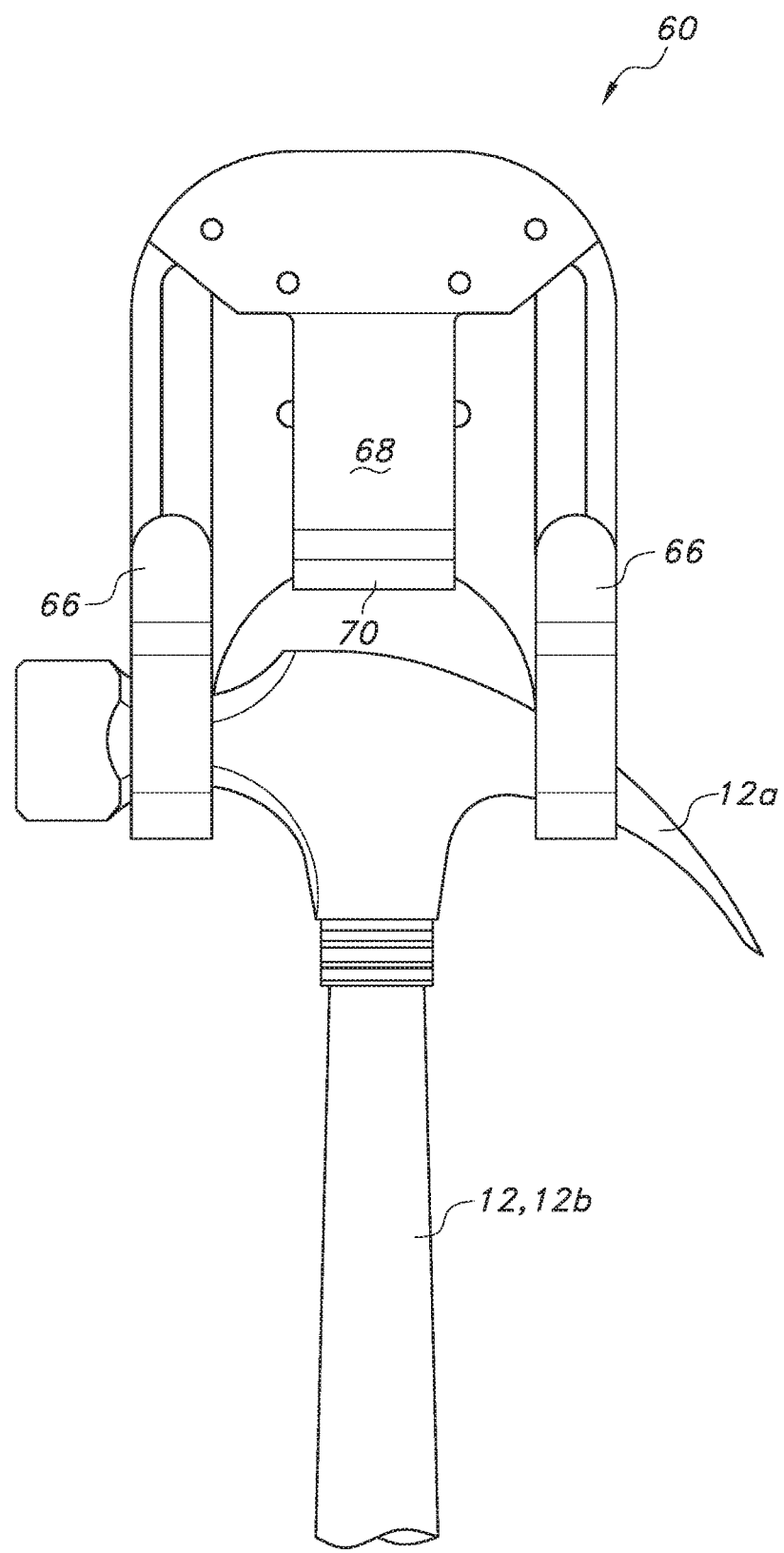
FIG. 11 front elevational view showing the tool retaining apparatus of FIG. 5 holding a tool.

The base 62 may included thereon a securement member 68 in the form of a cantilevered piece of resilient material similar to the securement member 18 described above. The securement member 68 has a proximal end 67 secured to the base. The securement member 68 extends from the proximal end 67 to the unsupported distal end 69. The distal end 69 of the securement member has an inwardly curved portion forming a catch 70 that may be disposed above the support surface 72 of the arms. With reference to FIG. 12, the catch 70 may have a locking first position in which it is spaced from the base 62 and extends above the support surface 72 and over the head of a tool 12a. In this position, the distal end 69, with the catch 70, may be disposed over a medial portion of the support surface 72 as shown in FIGS. 7 and 12. The catch 70 is also disposed below the arms upper ends 76. Thus, upward movement of the tool 12 is limited by the catch 70 when it is in the locked position.

With reference to FIG. 13, the distal end 69 may be urged toward an unlocked second position in which it is moved toward the base 62. In the unlocked position, the securement member catch 70 is positioned such that it permits a clearance path 74 to be formed to permit the tool 12 to be moved upwardly above the ends of the arms 76 and cleared of the tool retaining apparatus 60. In the unlocked position, the catch 70 may be positioned such a that in a fully retracted position it may extend into an open space 71 in the base between the arms 76 and past a back side of the base 62.

A holding space 78 is formed between the arms support portion 72 and the securement member distal end 69 to accommodate the retained portion of the tool 12. When the tool is in the retained position, the securement member 68 sits above and over the tool 12 and prevents it from being lifted upwardly above the top ends of the arms 76. In order to remove the tool, the securement member 68 may be urged toward the unlocked position as shown in FIG. 13. In this position, the distal end 69, with catch 70, is no longer disposed above a medial portion of the support surface 72, but instead lies closer to the base 62 then when in the locked position. This creates the path 74 through which the tool head may travel so that the tool may be separated from the tool retaining apparatus 10.

The base 62 may be secured to the belt of a user via slots 80 formed therein. A belt or strap may be inserted through the slots. Alternatively, the back side of the base may include a lug for attachment to a retaining device or a clip for securement to a belt or other equipment.

Similar to the previously described embodiment, in order to secure the tool within the tool retaining apparatus 60, the user may place the handle between the arms and lower the hammer head such that it retracts the catch 69 and sits on the support arms 66. The catch then extends outwardly above the tool head, FIG. 12. In this secured position, the tool 12 is securely retained in the tool retaining apparatus 60. The act of placing the tool within the tool securement device 10 causes it to be secured therein. No further action of the user is required.

In order to remove the tool 12 from the tool retaining apparatus 60, a user may urge the catch 69 toward the second unlocked position as shown in FIG. 13. In this position, with the catch 69 moved away from the tool 12, a clear unobstructed path 74 is created between the upwardly ending portion of the arms 66 and the catch. This permits the tool 12 to be lifted up and over the arms and separated from the tool retaining apparatus 10. The position of the catch 69 just above the head of the hammer permits a user to, with one hand, depress the catch and lift the tool 12 free of the tool retaining apparatus 10.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A tool retaining apparatus comprising: a base; a tool support secured to the base, the tool support having a pair of spaced arms for supporting a tool there between; and a securement member including an elongate resilient, cantilevered member disposed on the base between the two arms, the securement member having a proximal end fixedly secured to the base and a distal end forming a catch, the distal end and the pair of spaced arms forming a tool holding space there between adapted to receive at least a portion of a tool, the distal end being movable from a first position wherein a path to the tool holding space is dosed by the securement member distal end to prevent removal of the tool therefrom and to a second position in a direction toward the base wherein the path is open to permit removal of the tool from the tool holding space, wherein the securement member has a first end secured to the base, the distal end having a first position, wherein said distal end obstructs the path into the tool holding space and a second position obtained upon flexing of the resilient securement member wherein the path of said tool is unobstructed by said distal end.

2. The retaining apparatus as defined in claim 1, wherein the base has an attachment device for securing the base to a user.

3. The retaining apparatus as defined in claim 2, wherein the attachment device includes a slot formed in the base adapted to receive a belt.

4. The retaining apparatus as defined in claim 2, wherein the attachment device includes a lug secured to the base.

5. The retaining apparatus as defined in claim 1, wherein the base and the arms are formed from a single piece of material and the arms are non-pivotable with respect to the base.

6. The retaining apparatus as defined in claim 1, wherein the distal end includes a curved surface.

7. The retaining apparatus as defined in claim 1, wherein at least one of the spaced arms has a distal end which extends outwardly from the base.

8. A tool retaining apparatus comprising:
a base;
a tool support secured to the base, the tool support having a pair of spaced arms for supporting a tool there between, the arms having a support surface for supporting a tool thereon; and
a securement member disposed on the base between the two arms and spaced from the support surface, wherein the securement device and support arms form a tool holding space space there between adapted to receive a head of a tool, the securement member having a proximal end secured to the base and an opposed distal end, the distal end having a first position extending over and above the support surface, wherein the distal end blocks a tool removal path between the support surface and ends of the arms to prevent removal of a tool from the tool holding space, and a second position closer to the base than when in the first position and unblocks the tool removal path to permit removal of the tool from the tool holding space.

9. The tool retaining apparatus as defined in claim 8, wherein the securement member includes an elongate cantilevered resilient member and wherein the distal end forms a catch for preventing removal of the tool.

10. The tool retaining apparatus as defined in claim 8, wherein each of the pair of spaced arms has a first portion extending outwardly from the base forming the support surface and a second portion extending orthogonally from the first portion.

11. The tool retaining apparatus as defined in claim 8, wherein the base and pair of arms are formed of one integral piece.

12. A tool retaining apparatus comprising:
a base;
a tool support secured to the base, the tool support having a support surface adapted to support a tool thereon; and
a securement member disposed on the base, the securement member including a cantilevered resilient member having a proximal end fixedly secured to the base and an opposed distal end, the distal end and support surface forming a tool holding space there between adapted to receive at least a portion of a tool, the distal end having an unbiased first position, wherein a path to the tool holding space is closed by the distal end to prevent removal of the tool therefrom, and the distal end is able to be urged from the unbiased first position toward the base and to a biased second position wherein the path to the tool holding space is open to permit removal of the tool from the tool holding space.

13. The tool retaining apparatus as defined in claim 12, wherein the tool support includes a first curved arm.

14. The tool retaining apparatus as defined in claim 13, wherein the tool support includes a second curved arm spaced from the first curved arm, and movement of the securement member is independent of the first and second curved arms.

15. The tool retaining apparatus as defined in claim 12, wherein the securement member flexes upon movement form the first position to the second position.

16. The retaining apparatus as defined in claim 1, wherein the securement member has a first end including a planar member non-rotatably secured to the base.

* * * * *